US012643253B2

(12) United States Patent
Aoyama

(10) Patent No.: US 12,643,253 B2
(45) Date of Patent: Jun. 2, 2026

(54) CUTTING MACHINE

(71) Applicant: MAKITA CORPORATION, Anjo (JP)

(72) Inventor: Syuji Aoyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 174 days.

(21) Appl. No.: 18/605,897

(22) Filed: Mar. 15, 2024

(65) Prior Publication Data

US 2024/0308100 A1 Sep. 19, 2024

(30) Foreign Application Priority Data

Mar. 17, 2023 (JP) ................................ 2023-043368

(51) Int. Cl.
*B27B 9/02* (2006.01)

(52) U.S. Cl.
CPC ..................................... *B27B 9/02* (2013.01)

(58) Field of Classification Search
CPC ........... B27B 9/02; B27B 5/29; B23D 59/002; B23D 47/00; B23D 47/02; B23D 45/024; B23D 45/044; B23D 45/14; B23D 49/167; B23D 45/04; B23Q 17/2233; Y10T 83/7734
See application file for complete search history.

(56) References Cited

U.S. PATENT DOCUMENTS

| | | | | |
|---|---|---|---|---|
| 813,714 A * | 2/1906 | Ketcham | ................. | F16B 39/24 411/161 |
| 2,346,961 A * | 4/1944 | Lamb | ......................... | B27B 9/02 30/376 |
| 3,262,472 A * | 7/1966 | McCarty | ................... | B27B 9/02 30/376 |
| 4,870,758 A * | 10/1989 | Fushiya | .................... | B27B 9/02 30/296.1 |
| 5,271,155 A * | 12/1993 | Fuchs | ....................... | B27B 9/02 30/376 |
| 6,601,305 B1 * | 8/2003 | Fukuoka | ................... | B27B 9/02 30/376 |

(Continued)

FOREIGN PATENT DOCUMENTS

| | | | | |
|---|---|---|---|---|
| DE | 834897 C * | 11/1949 | | |
| DE | 10159485 A1 * | 7/2002 | ............... | B27B 9/02 |

(Continued)

*Primary Examiner* — Jonathan G Riley
(74) *Attorney, Agent, or Firm* — Oliff PLC

(57) ABSTRACT

A cutting machine includes a base having an abutment surface, a cutting machine body and at least one tilt support part that supports the cutting machine body such that the cutting machine body can be tilted relative to the base around a first axis. The at least one tilt support part includes a tilt plate fixed to the cutting machine body, an angular plate arranged to face the tilt plate and fixed to the base, and a link arm configured to connect the tilt plate and the angular plate. When the cutting machine body is tilted, the tilt plate tilts together with the cutting machine body, and facing surfaces of the tilt plate and the angular plate slide in contact with each other, and the link arm tilts around a second axis parallel to the first axis in interlocking with tilting of the cutting machine body.

18 Claims, 14 Drawing Sheets

(56) References Cited

U.S. PATENT DOCUMENTS

| | | | | |
|---|---|---|---|---|
| 7,290,342 | B2 * | 11/2007 | Hartmann | B27B 9/02 403/111 |
| 2005/0155232 | A1 * | 7/2005 | Bocka | B27B 9/02 30/377 |
| 2018/0290327 | A1 | 10/2018 | Goto et al. | |
| 2020/0254576 | A1 | 8/2020 | Kume et al. | |

FOREIGN PATENT DOCUMENTS

| | | | | |
|---|---|---|---|---|
| DE | 10 2018 125 423 | A1 | | 4/2020 |
| JP | 2004-142105 | A | | 5/2004 |
| JP | 2007136794 | A | * | 6/2007 |
| JP | 2018-176310 | A | | 11/2018 |
| JP | 2020-128026 | A | | 8/2020 |
| TW | M288845 | U | * | 3/2006 |

* cited by examiner

CUTTING MACHINE

CROSS-REFERENCE TO RELATED APPLICATIONS

The present application claims priority to Japanese patent application No. 2023-043368 filed on Mar. 17, 2023, the contents of which are hereby fully incorporated herein by reference.

TECHNICAL FIELD

The present disclosure relates to a cutting machine.

BACKGROUND

A cutting machine is known, which has a generally rectangular base having an abutment surface for abutment with a workpiece, and a cutting machine body to which a blade is mounted, and is configured to cut (obliquely cut) a workpiece with a blade tilted relative to the workpiece by tilting the cutting machine body relative to the base. As a kind of such a cutting machine, Japanese Unexamined Patent Application Publication No. 2020-128026 (patent document 1) discloses a plunge circular saw. The circular saw of the patent document 1 has an angular plate fixed to the base and a front bracket fixed to the machine body having a blade. Two protruding rails are provided on a front surface of the front bracket and extend in a circular arc shape around a tilt axis, and two circular arc recessed rails are provided on the angular plate and configured to be engaged with the two protruding rails. The protruding rails and the recessed rails slide in contact with each other when the machine body is tilted relative to the base.

SUMMARY

In the circular saw of the patent document 1, the area of engagement between the protruding rails and the recessed rails decreases as the tilt angle of the machine body relative to the base increases. This decrease of the engagement area may cause rattling between the machine body and the base, and it may become difficult to smoothly tilt the machine body relative to the base. Not only a circular saw but other cutting machines configured such that a cutting machine body to which a blade is mounted is tilted relative to the base may have such a problem in common. Therefore, it is desired to provide a technique for reducing rattling during tilting operation and smoothly tilting the cutting machine body relative to the base.

According to an aspect of the present disclosure, a cutting machine is provided. The cutting machine has a base, a cutting machine body and at least one tilt support part. The base has an abutment surface for abutment with a workpiece. The cutting machine body includes an electric motor configured to provide a rotational driving force to a blade. The cutting machine body is arranged on a second side relative to the abutment surface of the base. The at least one tilt support part is configured to support the cutting machine body such that the cutting machine body can be tilted relative to the base around a first axis parallel to the abutment surface. The at least one tilt support part includes a tilt plate, an angular plate and a link arm. The tilt plate is configured to protrude to the second side relative to the base. The tilt plate is fixed to the cutting machine body. The angular plate is configured to protrude to the second side relative to the base. The angular plate is arranged to face the tilt plate in a direction parallel to the first axis. The angular plate is fixed to the base. The link arm is configured to connect the tilt plate and the angular plate. When the cutting machine body is tilted, (1) the tilt plate tilts together with the cutting machine body, (2) facing surfaces of the tilt plate and the angular plate slide in contact with each other, and (3) the link arm tilts around a second axis parallel to the first axis in interlocking with tilting of the cutting machine body.

According to this aspect, the tilt plate and the angular plate are connected by the link arm, and the link arm tilts around the second axis parallel to the first axis that is a tilting center of the cutting machine body, in interlocking with tilting of the cutting machine body. The state of connection between the tilt plate and the angular plate by the link arm is maintained regardless of the tilt angle. This reduces rattling between the tilt plate and the angular plate due to increase of the tilt angle of the cutting machine body, so that the cutting machine body can be smoothly tilted relative to the base.

DETAILED DESCRIPTION OF THE EMBODIMENTS

Figure 1:
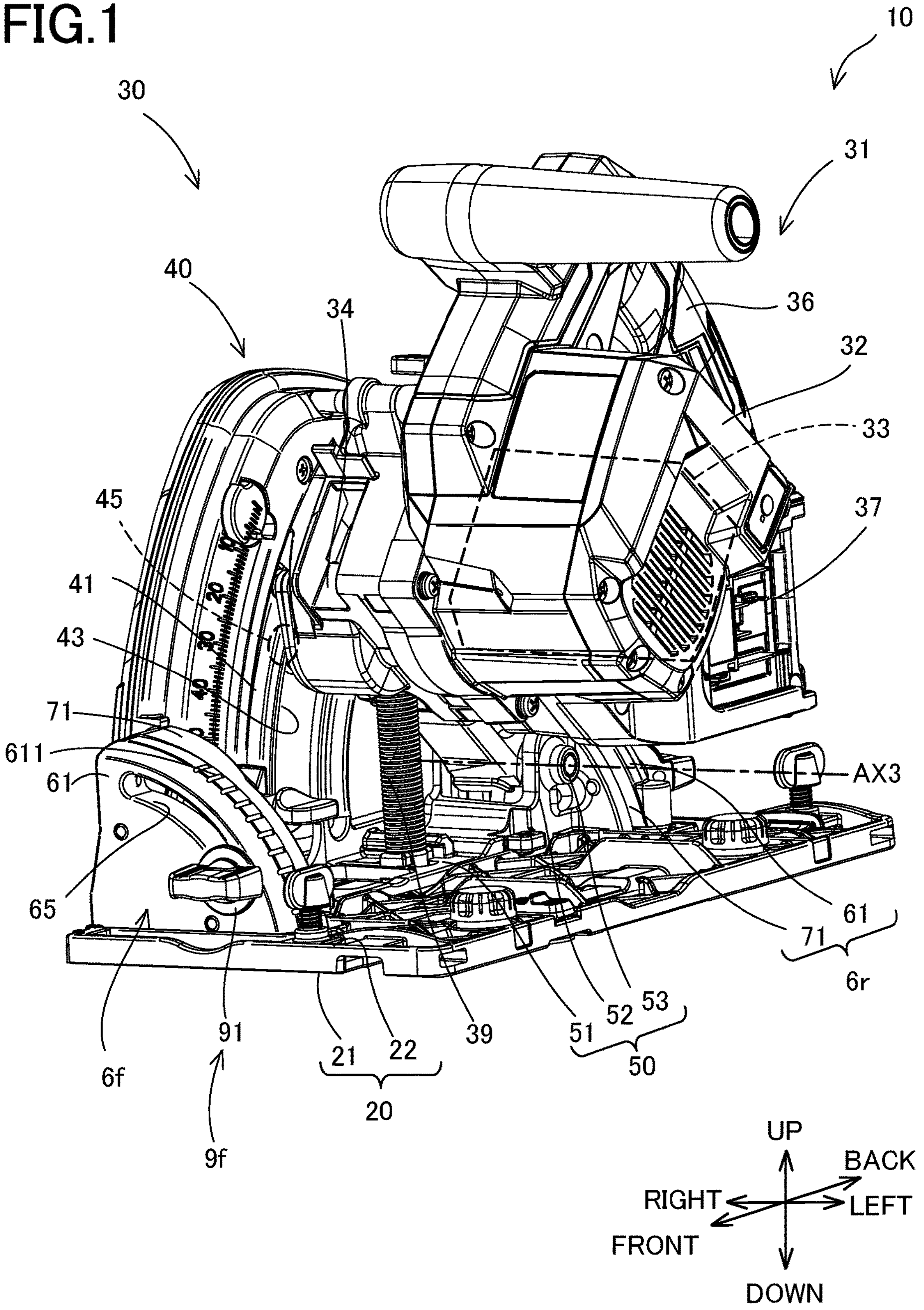
FIG. 1 is a perspective view of a circular saw of a first embodiment of the present disclosure.

In one non-limiting embodiment according to the present disclosure, the second axis may be provided on the second side relative to the abutment surface of the base.

According to this embodiment, the blade mounted to the cutting machine body is properly supported by the link arm and a member that defines a rotation (tilt) axis of the link arm. Therefore, the cutting machine body can be smoothly tilted relative to the base even if the mass of the blade mounted to the cutting machine body is relatively large.

In addition or in the alternative to the preceding embodiment, the first axis may be a virtual axis arranged on a first side opposite to the second side relative to the abutment surface of the base.

According to this embodiment, the first axis around which the cutting machine body is tilted is a virtual axis arranged on the side opposite to the side on which the cutting machine body is located relative to the base, or on the workpiece side. With this structure, displacement of the cutting position of the workpiece depending on the tilt angle is reduced.

In addition or in the alternative to the preceding embodiments, the at least one tilt support part may include a circular arc groove and a guide pin. The circular arc groove may be formed in one of the tilt plate and the angular plate and extend in a circular arc shape along a tilting direction of the cutting machine body. The guide pin may have a first part fixed to the other of the tilt plate and the angular plate and a second part protruding toward the circular arc groove. The guide pin may be configured such that the second part slides along the circular arc groove when the tilt plate is tilted.

According to this embodiment, the second part of the guide pin moves along the circular arc groove when the tilt plate is tilted in interlocking with the cutting machine body. Further, regardless of the tilt angle of the cutting machine body, the circular arc groove restricts movement of the guide pin in directions other than the direction along the circular arc groove (the tilting direction). Therefore, the circular arc groove and the guide pin reduce rattling between the tilt plate and the angular plate due to increase of the tilt angle of the cutting machine body, while supporting (guiding) the cutting machine body to tilt around the first axis. Thus, the cutting machine body can be further smoothly tilted relative to the base.

In this embodiment, the circular arc groove may have a circular arc center on the first axis. The circular arc groove and the guide pin may be configured to cooperate with each other to tilt the cutting machine body around the first axis.

In addition or in the alternative to the preceding embodiments, the link arm may have a base end part arranged on the second axis and a distal end part on an opposite side to the base end part. The distal end part may be fixed to the tilt plate on a side closer to the first axis than the circular arc groove and configured to tilt together with the tilt plate.

According to this embodiment, space of the tilt plate and the angular plate on the side closer to the first axis than the circular arc groove can be effectively utilized.

In addition or in the alternative to the preceding embodiments, the cutting machine may further have an angle fixing part configured to fix a tilt angle of the cutting machine body relative to the base. The angle fixing part may have a fixing groove, an angle fixing shaft and an operation part. The fixing groove may be formed in the angular plate and extend in a circular arc shape along the tilting direction of the cutting machine body. The angle fixing shaft may extend in parallel to the first axis and be inserted through the fixing groove and fixed to the tilt plate. The operation part may be connected to the angle fixing shaft and configured to be operated by a user to fix the tilt plate and the angular plate in a direction parallel to the first axis. The circular arc groove of the tilt support part may be arranged on a side closer to the first axis than the fixing groove.

According to this embodiment, the circular arc groove can be arranged in space of the tilt plate and the angular plate on the side closer to the first axis than the fixing groove, while the tilt angle of the cutting machine body relative to the base can be fixed.

In this embodiment, the fixing groove may have a circular arc center on the first axis.

In addition or in the alternative to the preceding embodiments, the circular arc groove may be the fixing groove formed in the angular plate. The guide pin may be the angle fixing shaft.

According to this embodiment, the circular arc tilt angle fixing groove and the angle fixing shaft can be utilized to reduce rattling between the tilt plate and the angular plate due to increase of the tilt angle of the cutting machine body while supporting (guiding) the cutting machine body to tilt around the first axis. Therefore, the cutting machine body can be smoothly tilted relative to the base, while the structure of the tilt support part is simplified.

In this embodiment, a part of the angle fixing shaft corresponding to the first part of the guide pin may be fixed to the tilt shaft. A part of the angle fixing shaft corresponding to the second part of the guide pin may be configured to slide within the fixing groove when the tilt plate is tilted.

In addition or in the alternative to the preceding embodiments, the at least one tilt support part may further include a guide plate that is separately formed from the tilt plate and the angular plate and fixed to the one of the tilt plate and the angular plate. The circular arc groove may be formed in the guide plate.

According to this embodiment, the guide plate is a separate component from the one of the tilt plate and the angular plate, so that the guide plate may be formed of a different material from the one of the tilt plate and the angular plate. Therefore, the freedom of materials of the parts that slide in contact with each other by tilting operation is increased.

In addition or in the alternative to the preceding embodiments, the guide plate may be formed of steel.

According to this embodiment, the wear resistance of the parts that slide in contact with each other by tilting operation is enhanced.

In addition or in the alternative to the preceding embodiments, the at least one tilt support part may further include a first pin and a second pin. The first pin may be arranged in a first end of the circular arc groove formed in the guide plate. The second pin may be arranged in a second end opposite to the first end of the circular arc groove formed in the guide plate. The first and second pins may be configured to fix the guide plate to the one of the tilt plate and the angular plate.

According to this embodiment, the guide plate can be fixed to the one of the tilt plate and the angular plate with a simple structure.

In addition or in the alternative to the preceding embodiments, the guide pin may have a shaft body and a bearing fitted onto the shaft body.

According to this embodiment, the guide pin can be smoothly slid relative to the circular arc groove, so that wear of the parts that slide in contact with each other by tilting operation is reduced.

In addition or in the alternative to the preceding embodiments, the at least one tilt support part may have a support shaft fixed to the angular plate and having the second axis as a center axis. The base end part of the link arm may be fitted on the support shaft. The distal end part of the link arm may be fitted on a distal end shaft fixed to the tilt plate.

According to this embodiment, the tilt plate and the angular plate are connected via the support shaft, the link arm and the distal end shaft.

In addition or in the alternative to the preceding embodiments, the cutting machine may be a portable cutting machine having a grip part configured to be held by a user.

According to this embodiment, even with a portable cutting machine in which user's force is easily applied to the cutting machine body during tilting operation, rattling during tilting operation is reduced, so that a user can smoothly perform tilting operation.

First Embodiment

A first embodiment of the present disclosure is now described with reference to FIGS. 1 to 9. In this embodiment, a kind of a portable cutting machine or a plunge circular saw (hereinafter simply referred to as a circular saw 10) is descried as a representative example of a cutting machine of the present disclosure.

The structure of the circular saw 10 is now described in brief. The circular saw 10 includes a base 20, a cutting machine body 30 to which a blade 35 is mounted, a front tilt support part 6*f* and a rear tilt support part 6*r*. The cutting machine body 30 is arranged on a second side relative to the base 20. The circular saw 10 is configured to cut a workpiece W (see FIG. 2) placed on an opposite side (first side) to the cutting machine body 3 relative to the base 20.

In the following description, for the sake of convenience of explanation, a direction parallel to the machining (cutting) direction of the circular saw 10 is defined as a front-rear direction of the circular saw 10. In the front-rear direction, the side to which the workpiece W is moved relative to the circular saw 10 is defined as a rear side of the circular saw 10, and the opposite side is defined as a front side of the circular saw 10. In this embodiment, the side on which a user stands when holding the circular saw 10 by hand and machining (cutting) a workpiece W is the rear side, and the opposite side is the front side of the circular saw 10. Further, the side on which the workpiece W is placed relative to the base 20 is defined as a lower side of the circular saw 10, and the opposite side is defined as an upper side of the circular saw 10. The upper side is the side on which the cutting machine body 30 is located. Further, a direction orthogonal to the front-rear direction and the up-down direction is defined as a left-right direction of the circular saw 10. In the left-right direction, the right side as viewed from the rear is defined as a right side of the circular saw 10, and the opposite side is defined as a left side of the circular saw 10.

Figure 3:
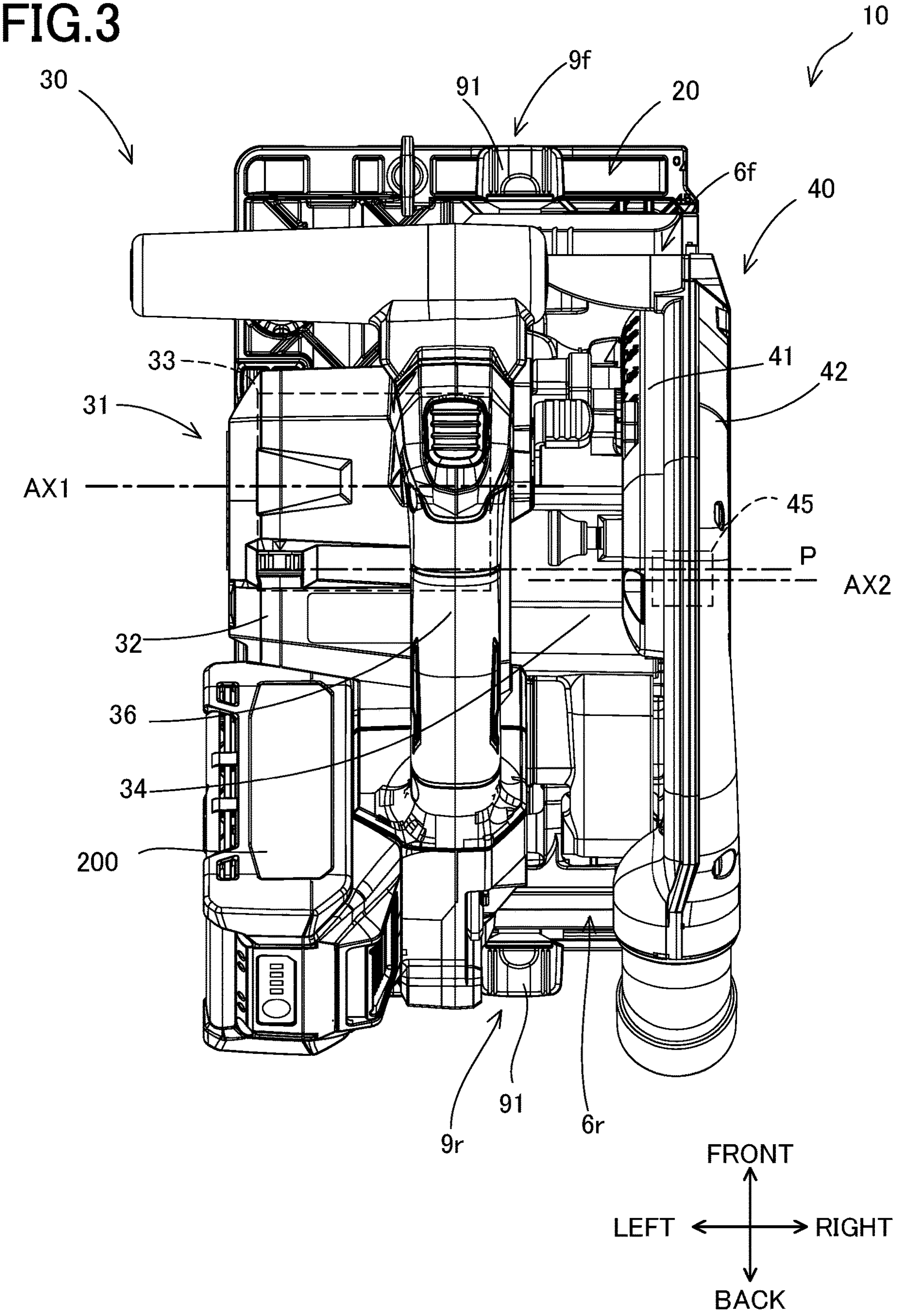
FIG. 3 is a top view of the circular saw corresponding to FIG. 2.
Figure 4:
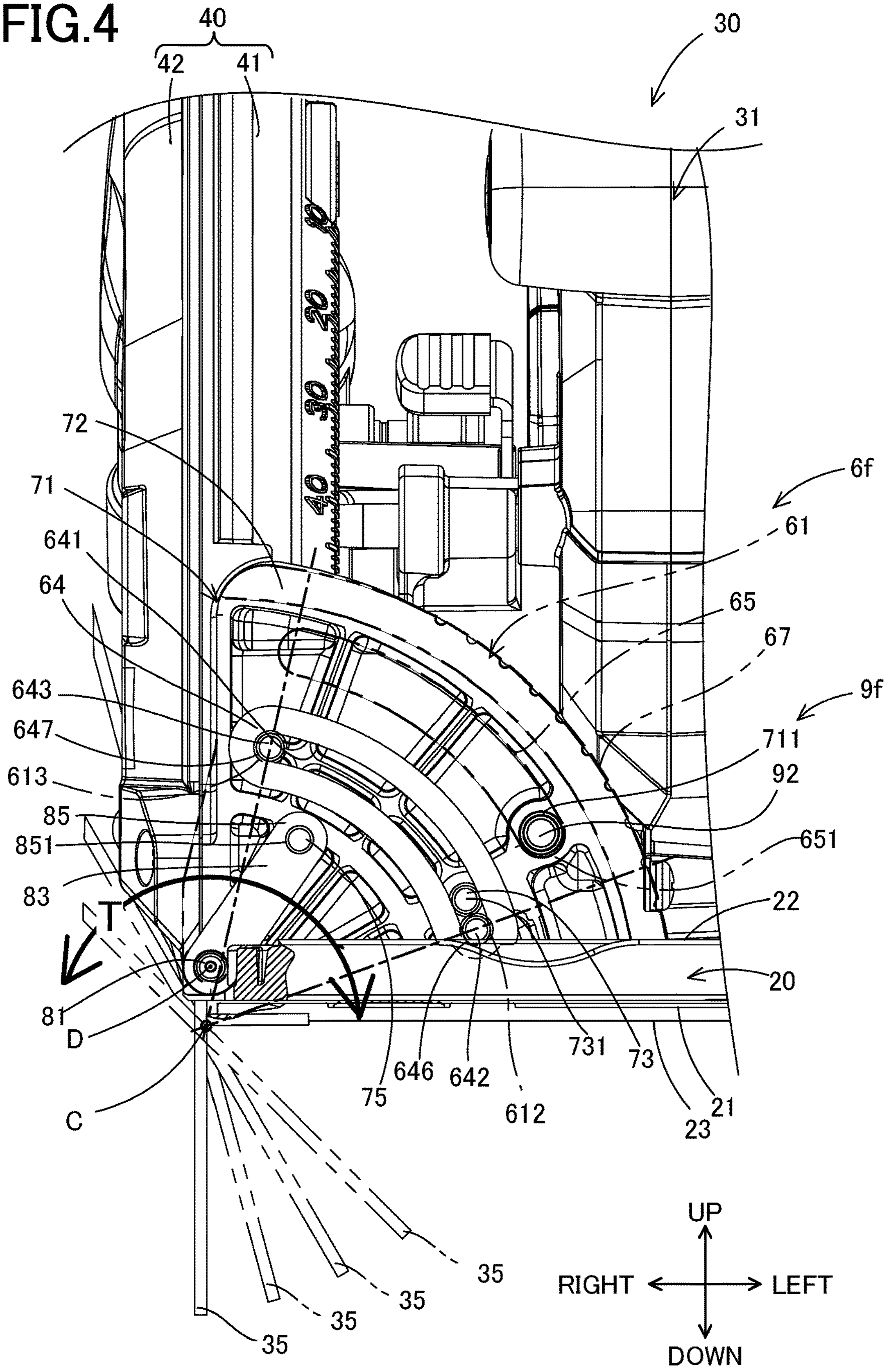
FIG. 4 is an enlarged view showing a front tilt support part and its vicinity, with an angular plate shown in broken line, and showing a blade tilted at various tilt angles for clear understanding of a first axis.
Figure 7:
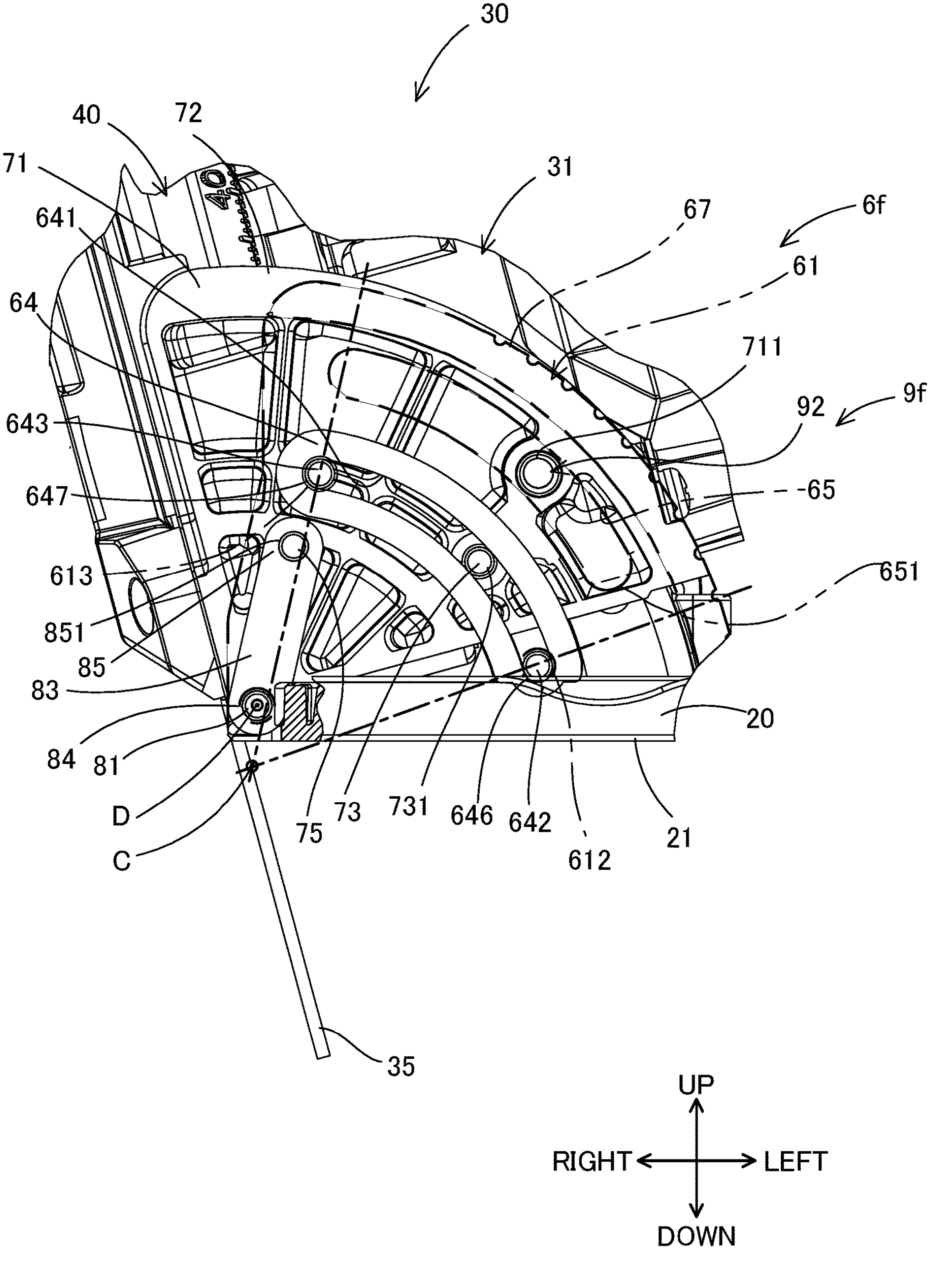
FIG. 7 is an enlarged view showing the front tilt support part and its vicinity, with the cutting machine body set at the tilt angle of 15°.
Figure 8:
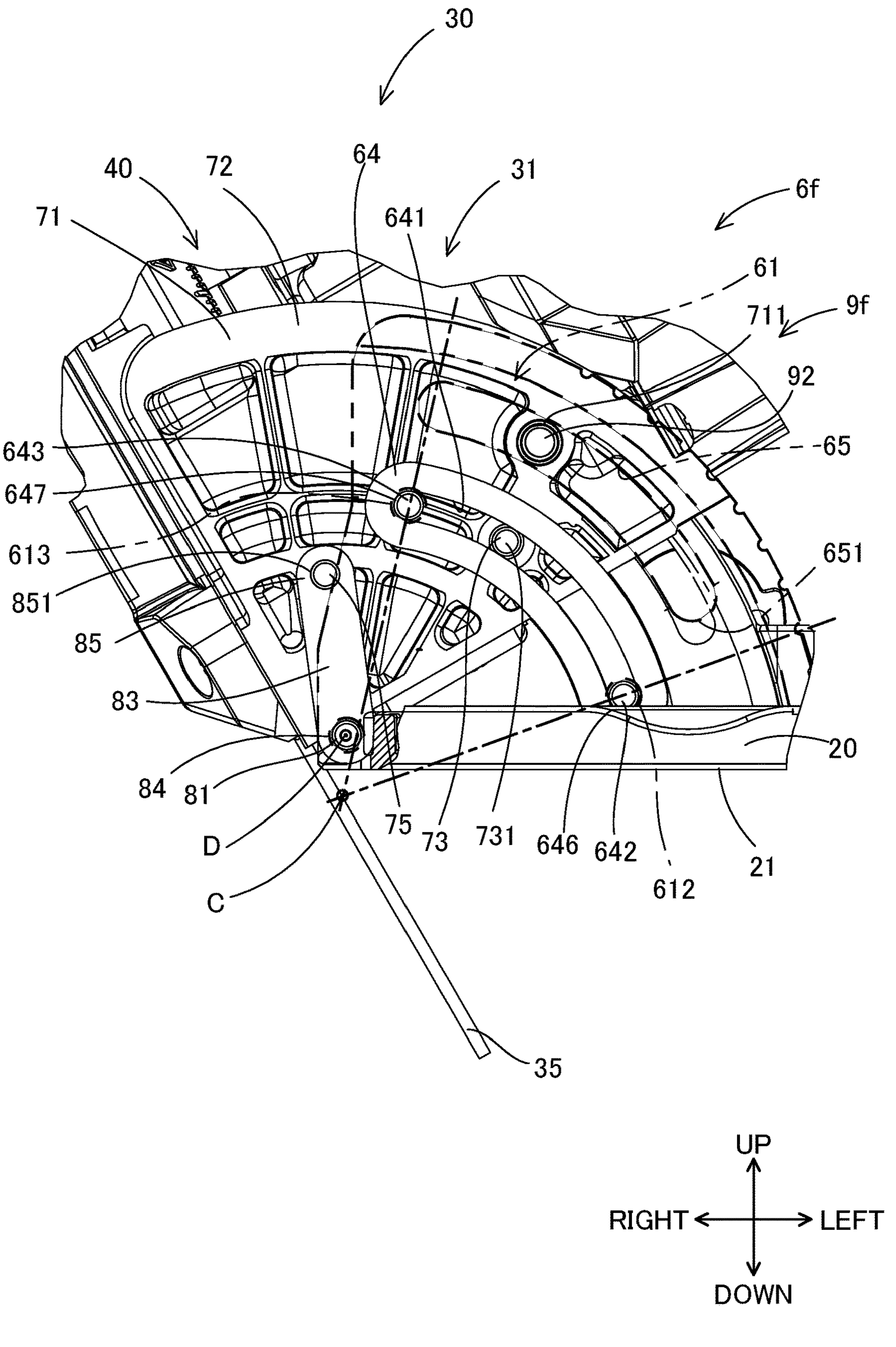
FIG. 8 is an enlarged view showing the front tilt support part and its vicinity, with the cutting machine body set at the tilt angle of 30°.
Figure 9:
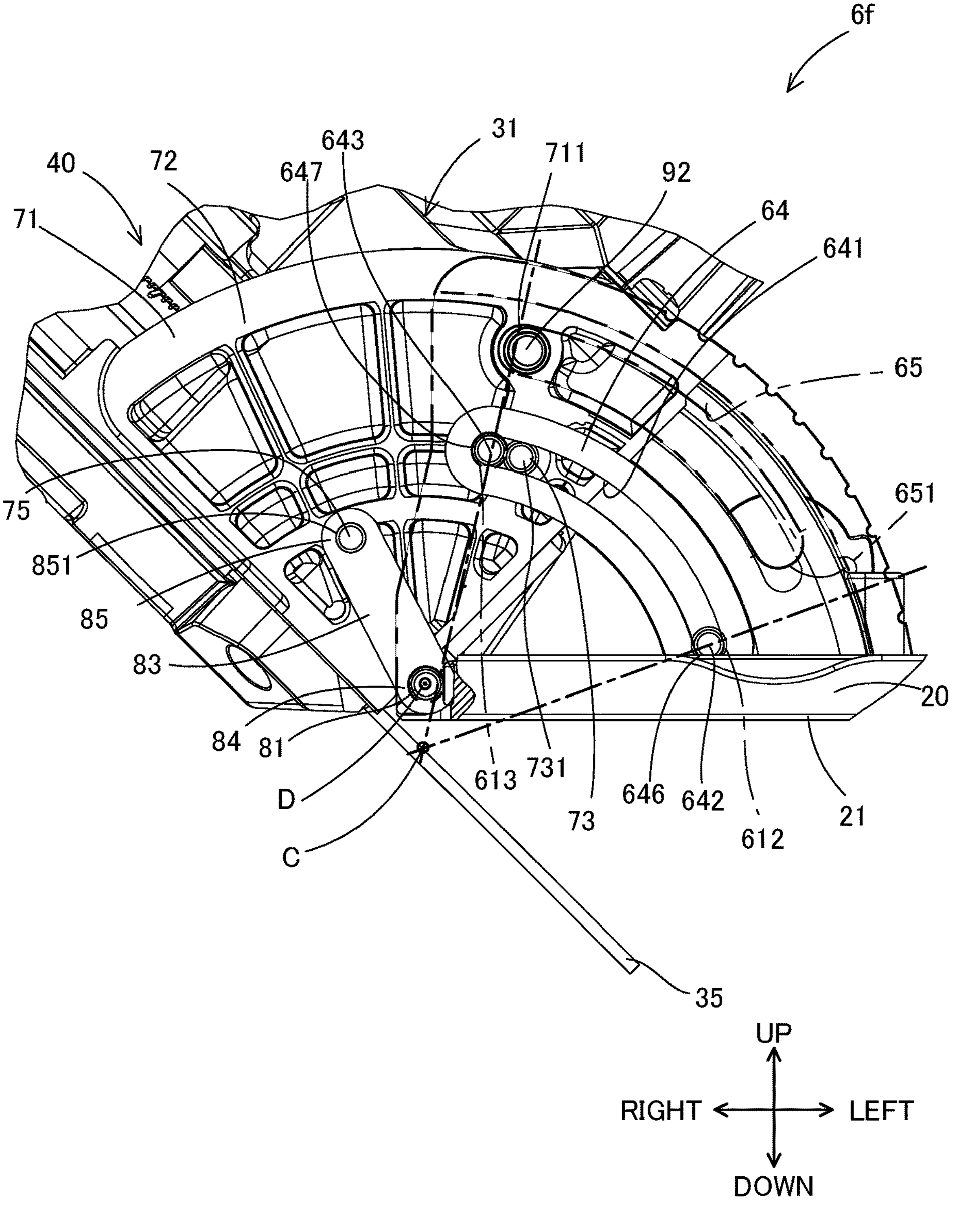
FIG. 9 is an enlarged view showing the front tilt support part and its vicinity, with the cutting machine body set at the tilt angle of 45°.
Figure 10:
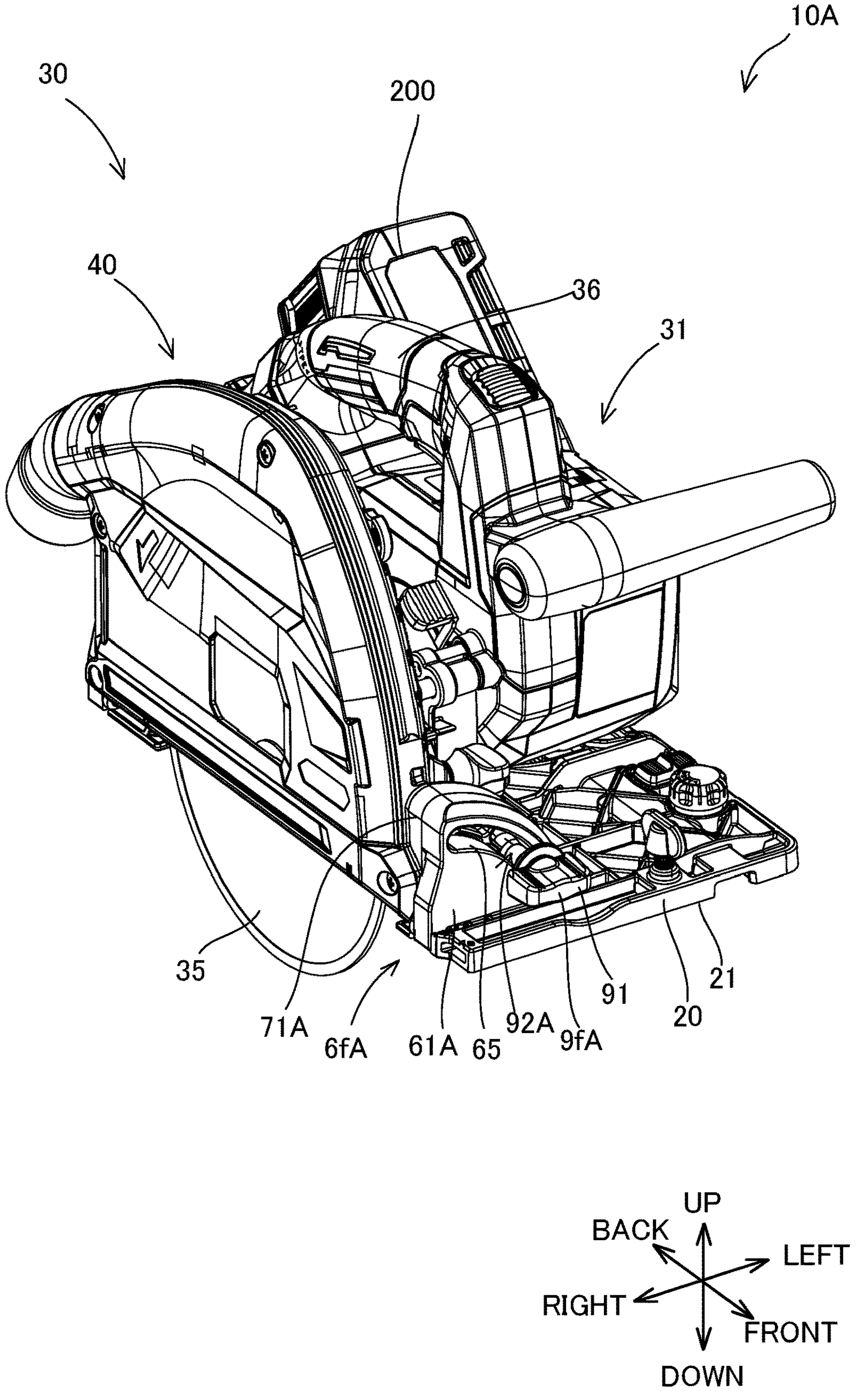
FIG. 10 is a perspective view of a circular saw of a second embodiment of the present disclosure, with a body part at a bottom dead center.
Figure 11:
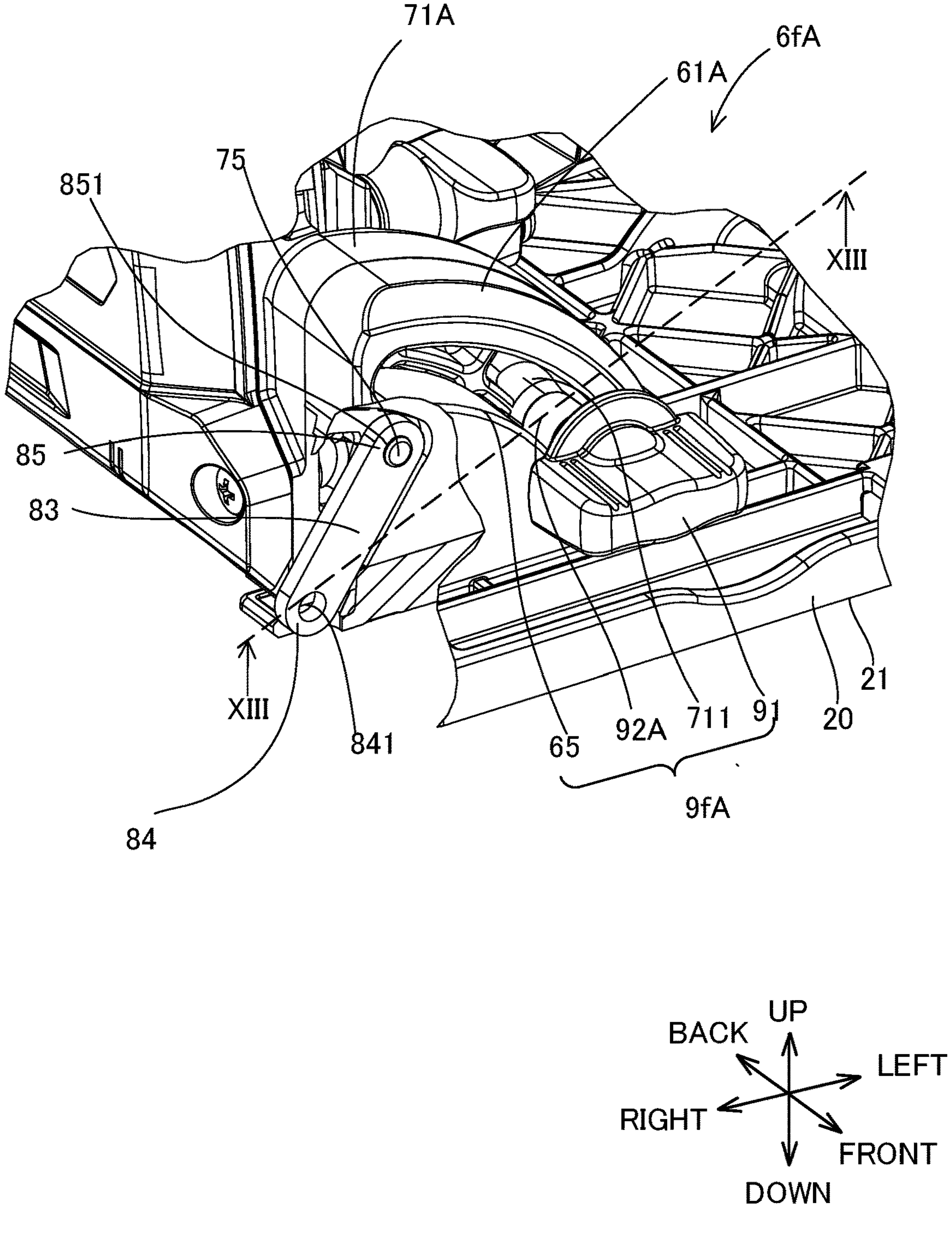
FIG. 11 is an enlarged view showing a front tilt support part and its vicinity of the second embodiment, with the cutting machine body set at the tilt angle of 0°.

The cutting machine body 30 is configured to tilt relative to the base 20 around a tilt axis C (see FIG. 4). FIGS. 1 to 6 show the cutting machine body 30 set at the tilt angle of 0°, and FIGS. 7, 8 and 9 show the cutting machine body 30 set at the tilt angles of 15°, 30° and 45°, respectively. The tilt angle of the cutting machine body 30 is also a tilt angle of the blade 35. The tilt axis C is parallel to the front-rear direction. A side surface of the blade 35 is orthogonal to the left-right direction when the tilt angle is 0°.

The base 20 has a generally rectangular shape. The longitudinal direction of the base 20 is the front-rear direction. The base 20 has an abutment surface 21 for abutment with the workpiece W. In this embodiment, the abutment surface 21 is a lower surface of the base 20. When a saw guide (guide rail) is used with the circular saw 10 to linearly cut the workpiece W, however, the base 20 may be placed with the abutment surface 21 in abutment with the saw guide. The cutting machine body 30 includes a body part 31 and a cover 40. The body part 31 is basically placed on the upper side relative to the base 20. The body part 31 includes a motor housing 32 that houses an electric DC motor 33 (see FIG. 1), a gear housing 34, and a grip 136 to be held by a user. As shown in FIG. 3, a rotational axis AX1 of the motor 33 extends in the left-right direction. The gear housing 34 houses a reduction gear and an output shaft having an axis AX2 extending in the left-right direction. The motor 33 rotates the blade 35 around the axis AX2 via the reduction gear and the output shaft. In this embodiment, a circular saw blade called a tipped saw is used as the blade 35. In this embodiment, the gear housing 34 is integrally formed with the motor housing 32. The grip 36 has a trigger for starting and stopping the motor 33.

The cover 40 is arranged on an edge part of the base 20 in the left-right direction on an upper surface 22 side of the base 20. In this embodiment, the cover 40 is arranged on a right edge part of the base 20. The blade 35 has a disc-like shape and is at least partially housed within the cover 40. Specifically, a circular arc through hole 43 (see FIG. 1) is formed through a left side wall 41 of the cover 40 in the left-right direction. The output shaft extends into the inside of the cover 40 through the through 43. An extending end of the output shaft serves as a mounting part 45 (see FIGS. 1 and 3) to which the blade 35 is removably mounted.

As shown in FIG. 1, a body support part 50 is provided on the lower side of the body part 31 and on the upper side of the base 20. The body support part 50 supports the body part 31 on the base 20 such that the body part 31 can oscillate (pivot) in the up-down direction. The body support part 50 has a plate-like base part 51 extending in the front-rear direction, a holding part 52 and a vertical oscillation shaft 53. The base part 51 extends from a lower edge of the cover 40 to the body part 31 side (below the gear housing 34) in the left-right direction. As shown in FIG. 1, a lower surface of the base part 51 abuts on the upper surface 22 of the base 20 when the tilt angle of the cutting machine body 30 is 0°. The holding part 52 is formed like a wall facing the left side wall 41 of the cover 40. An axis AX3 of the vertical oscillation shaft 53 extends in the left-right direction. The vertical oscillation shaft 53 is inserted into a through hole (not shown) that is formed through a rear part of the body part 31 (the gear housing 34) in the left-right direction. The vertical oscillation shaft 53 is held at right and left ends respectively by the left side wall 41 of the cover 40 and the holding part 52. Thus, the body part 31 can be vertically oscillated around the axis AX3.

Figure 2:
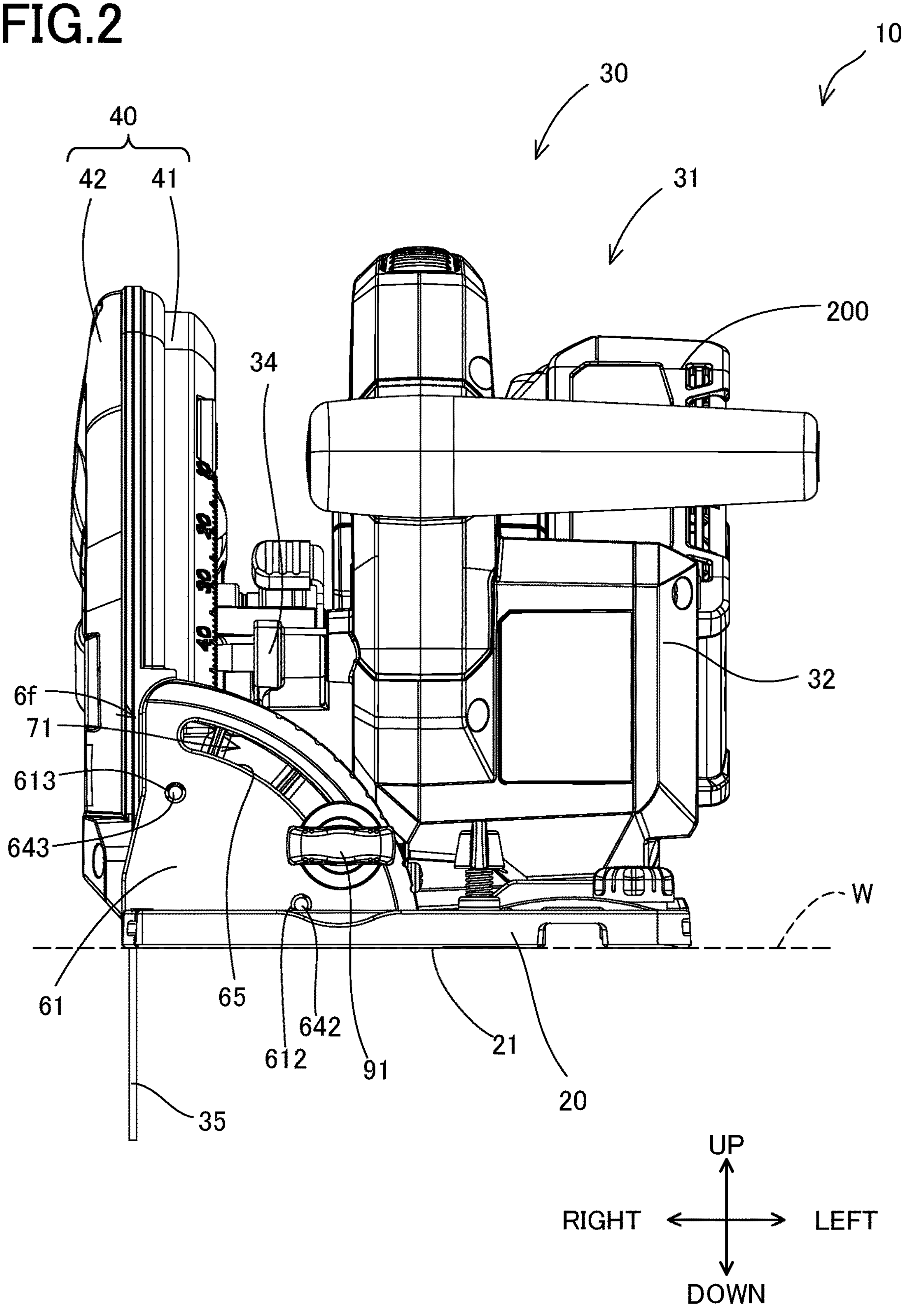
FIG. 2 is a front view of the circular saw, with a body part at a bottom dead center.

The body part 31 can be displaced between a top dead center shown in FIG. 1 and a bottom dead center shown in FIG. 2 by vertically oscillating around the axis AX3. The position of the top dead center is a position where the whole blade 35 is located above the lower surface 21 of the base 20 and entirely stored within the cover 40. The position of the bottom dead center is a position where the blade 35 most protrudes downward from the lower surface 21 of the base 20. A biasing spring 39 is disposed between the body part 31 and the base part 51 and always biases the body part 31 toward the top dead center.

The cutting machine body 30 further has a battery mounting part 37 (see FIG. 1) to which a battery 200 is removably mounted. The battery mounting part 37 is arranged behind the motor 33. The battery mounting part 37 has a pair of guide rails, a hook engagement part and terminals, and has a known structure to which the battery 200 can be removably mounted.

The front and rear tilt support parts 6f, 6r are configured to support the cutting machine body 30 such that the cutting machine body 30 can be tilted relative to the base 20. The tilt axis C is a virtual axis extending in the front-rear direction. As shown in FIG. 4, in this embodiment, the tilt axis C is arranged below the lower surface 21 of the base 20. The tilt axis C is arranged at a position substantially corresponding to a lower surface of a saw guide 23 (that may be used in abutment with the lower surface 21 of the base 20). The tilt axis C is included in the lower surface of the saw guide 23 or a virtual plane including the lower surface of the saw guide 23. The tilt axis C is arranged at a position overlapping with a left side surface of the blade 3 at any tilt angle. In this embodiment, the tilt axis C is virtually set at a position substantially corresponding to the lower surface of the saw guide 23 such that the blade 35 is not displaced in the left-right direction on an upper surface of the workpiece W at any tilt angle. The front tilt support part of and the rear tilt support part 6r are collectively referred to simply as tilt support parts 6f, 6r.

As shown in FIG. 4, the front tilt support part 6f mainly includes an angular plate 61, a tilt plate 71 and a link arm 83. The front tilt support part of further includes a guide plate 64, a guide pin 73 and a support shaft 81.

The angular plate 61 is arranged on a front part of the base 20 on the upper surface 22 side of the base 20. The angular plate 61 is formed to extend in parallel to the up-down direction and the left-right direction (to extend orthogonally to the front-rear direction) and fixed to the base 20. The angular plate 61 protrudes upward from the base 20. The angular plate 61 has a fan shape having a center angle of about 90° with the tilt axis C as a center. The angular plate 61 is formed of aluminum or synthetic resin (polymer).

A circular arc through hole 65 is formed through the angular plate 61 in the front-rear direction in the vicinity of a circular arc outer edge 67 of the angular plate 61 and extends along a tilting direction T (see FIG. 4) of the cutting machine body 30. A tilt angle fixing shaft 92 is inserted through the through hole 65. The shaft 92 has such an outer diameter that a clearance is formed between the shaft 92 and the through hole 65. The through hole 65 has a circular arc center on the tilt axis C or in the vicinity of the tilt axis C.

Figure 6:
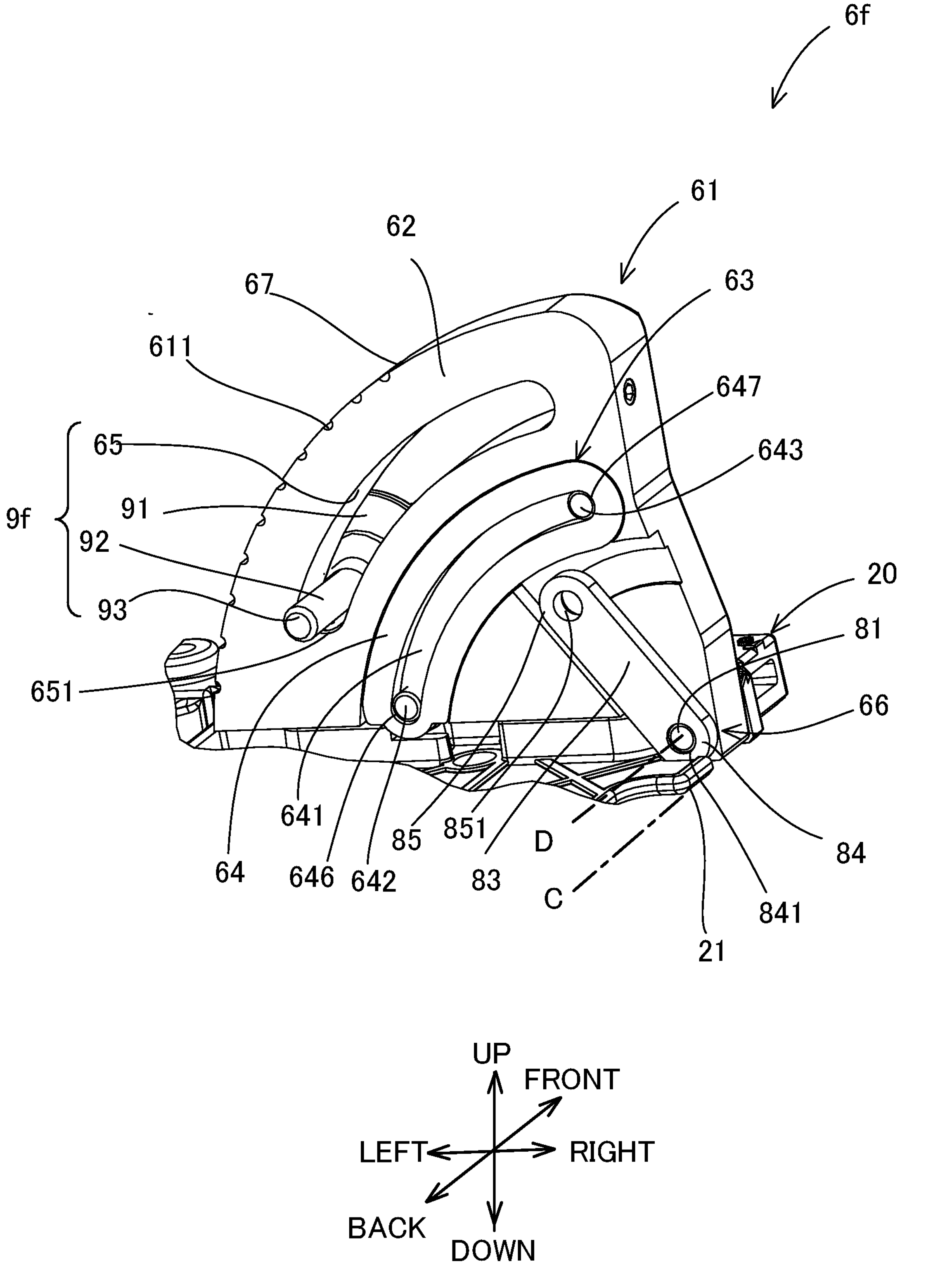
FIG. 6 is a rear view showing the front tilt support part and a link plate.

As shown in FIG. 6, the guide plate 64 is arranged radially inward (on the tilt axis C side) of the through hole 65 on a rear surface 62 of the angular plate 61. The guide plate 64 is fixed to the angular plate 61. The guide plate 64 has a circular arc groove 641 extending along the tilting direction T of the cutting machine body 30. In this embodiment, the guide plate 64 is formed of steel. In this embodiment, the circular arc groove 641 is a part formed through the guide plate 64 in the front-rear direction. The circular arc groove 641 can be said as a long groove (slot) extending in a circular arc shape. The circular arc groove 641 has a circular arc center on the tilt axis C or in the vicinity of the tilt axis C.

As shown in FIG. 6, a recess 63 is formed radially inward of the through hole 65 in the rear surface 62 of the angular plate 61 and recessed forward. The guide plate 64 is disposed in the recess 63. First and second pins 642, 643 are respectively arranged in both ends (first and second ends 646, 647) of the circular arc groove 641 in the extending direction. The first and second pins 642, 643 are respectively press-fitted into holes 612, 613 formed through the angular plate 61 in the front-rear direction (see FIG. 2). The guide plate 64 is positioned relative to the angular plate 61 by the first and second pins 642, 643.

A hole is formed through a corner part 66 (see FIG. 6) (a central corner part) of the fan shape of the angular plate 61 in the front-rear direction. The support shaft 81 is arranged through the hole. A center axis (axis D) of the support shaft 81 extends in the front-rear direction. A front end part of the support shaft 81 is press-fitted into the base 20 (the angular plate 61), so that the support shaft 81 is fixed to the base 20. As shown in FIG. 4, the axis D of the support shaft 81 is located above the tilt axis C. In this embodiment, the support shaft 81 itself overlaps with the tilt axis C when viewed in plan (when viewed from above or below). In other words, the positions of the support shaft 81 itself and the tilt axis C in the left-right direction overlap with each other. The axis D is located at a position deviated by 1 mm to the motor 33 side from the tilt axis C in the left-right direction.

As shown in FIG. 6, the link arm 83 is arranged radially inward (on the tilt axis C side) of the guide plate 64 disposed in the recess 63. A base end part 84 of the link arm 83 is arranged just behind the corner part 66. A hole 841 is formed through the base end part 84 in the front-rear direction. A rear end part of the support shaft 81 is loosely fitted into the hole 841 with a very slight clearance. Thus, the link arm 83 and the support shaft 81 can smoothly rotate.

Figure 5:
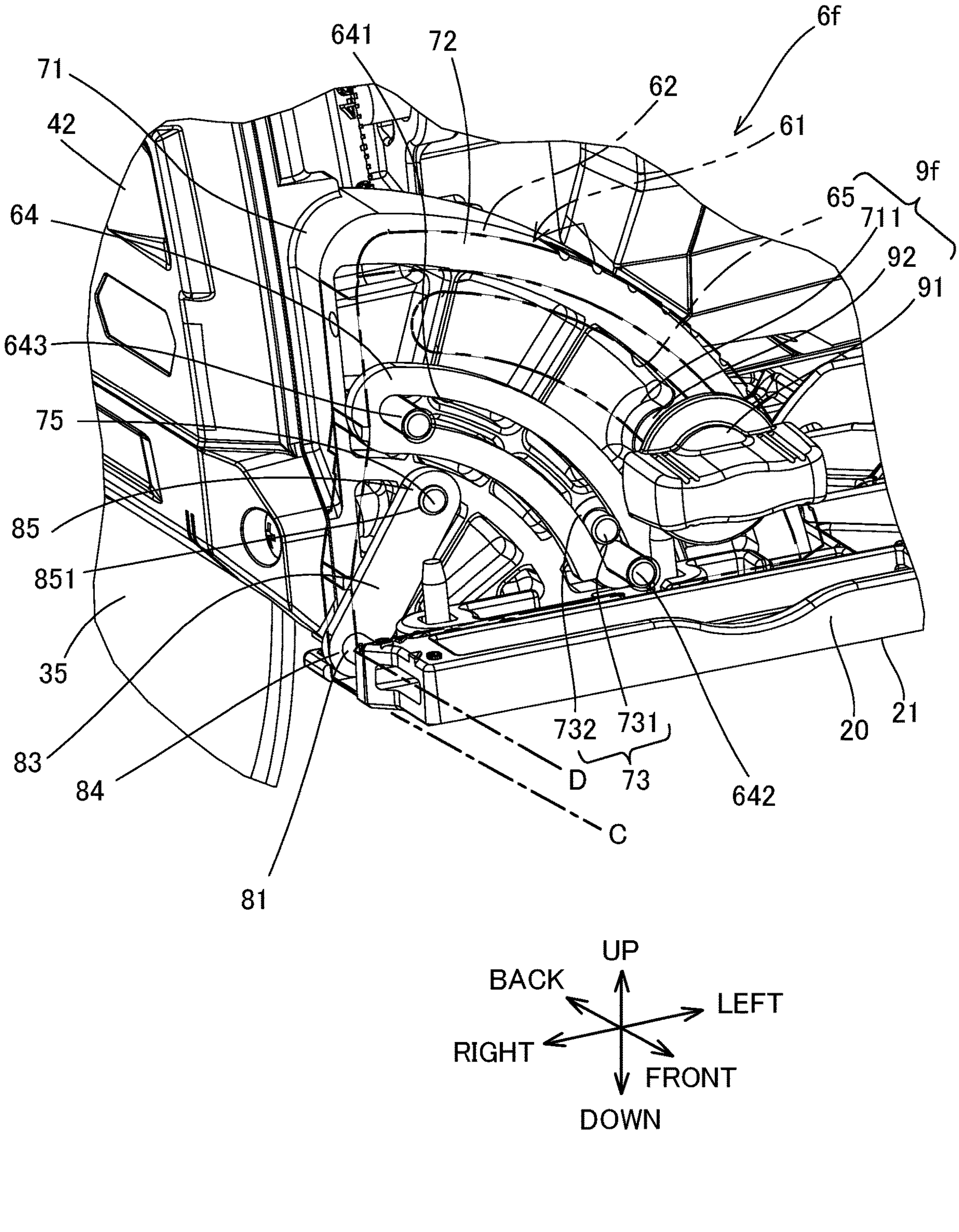
FIG. 5 is a perspective view of the front tilt support part and its vicinity, with the cutting machine body set at the tilt angle of 0°.

As shown in FIG. 1, the tilt plate 71 is arranged just behind the angular plate 61 on a front part of the base part 51. The tilt plate 71 protrudes upward from the base part 51. The tilt plate 71 has a fan shape having a center angle of about 90° with the tilt axis C as a center, and this fan shape is substantially the same as that of the angular plate 61. As shown in FIG. 5, a front surface 72 (facing surface) of the tilt plate 71 slidably abuts on a rear surface 62 of the angular plate 61. The tilt plate 71 is formed of aluminum or magnesium.

The tilt plate 71 is fixed to the cover 40. In this embodiment, the tilt plate 71 is integrally formed with the left side wall 41 of the cover 40, the base part 51, the holding part 52 and the tilt plate 71 of the rear tilt support part 6r. As shown in FIG. 5, a right side wall 42 of the cover 40 is screwed to the left side wall 41 and the tilt plate 71.

As shown in FIG. 5, a shaft fixing part 711 to which the angle fixing shaft 92 is fixed, a guide pin 73 and a link arm locking pin 75 are provided on the front surface 72 of the tilt plate 71. The guide pin 73 and the link arm locking pin 75 are press-fitted into the tilt plate 71. Axes of the pins 73 and 75 extend in the front-rear direction. The shaft fixing part 711, the guide pin 73 and the link arm locking pin 75 tilt together with the tilt plate 71 when the cutting machine body 30 is tilted.

The shaft fixing part 711 is a hole to which a rear end part 93 (see FIG. 6) of the angle fixing shaft 92 is fixed. The shaft fixing part 711 is formed in a position corresponding to the through hole 65 of the angular plate 61. As shown in FIG. 4, the shaft fixing part 711 is arranged in the tilt plate 71 so as to be located just behind a lower end part 651 (on the side close to the base 20) of the through hole 65 when the tilt angle is 0°.

The guide pin 73 is arranged radially inward of the shaft fixing part 711 on the tilt plate 71. As shown in FIG. 5, a rear part 732 (first part) of the guide pin 73 is fixed to the tilt plate 71 at a position corresponding to the circular arc groove 641 of the guide plate 64. A front part 731 (second part) of the guide pin 73 protrudes forward from the tilt plate 71. The guide pin 73 is arranged on the tilt plate 71 such that the front part 731 abuts on the first pin 642 when the tilt angle is 0°. The front part 731 of the guide pin 73 has such an outer diameter that it can slide in the circular arc groove 641. The guide pin 73 slides along the circular arc groove 641 of the guide plate 64 when the tilt plate 71 is tilted together with the cutting machine body 30.

As shown in FIG. 5, the link arm locking pin 75 is arranged radially inward of the guide 73 on the tilt plate 71. A hole 851 is formed in the front-rear direction through a distal end part 85 of the link arm 8 on the opposite side to the base end part 843. A front end part of the link arm locking pin 75 is loosely fitted into the hole 851 with a very slight clearance. Thus, the link arm 83 and the link arm locking pin 75 can smoothly rotate. As described above, the base end part 84 of the link arm 83 is fitted on the support shaft 81. Thus, the link arm 83 tilts around the axis D of the support shaft 81 in interlocking with tilting of the cutting machine body 30 when the tilt plate 71 is tilted together with the cutting machine body 30.

As shown in FIG. 5, an operation knob 91 is provided on a front surface of the angular plate 61. The operation knob 91 is mounted on a front end of the shaft 92. The operation knob 91 can be turned around an axis of the shaft 92 by user's manual operation. The operation knob 91 is configured to clamp the tilt plate 71 and the angular plate 61 in the front-rear direction when turned in a first direction around the axis of the shaft 92. Thus, the tilt plate 71 and the angular plate 61 are fixed in the front-rear direction, and the tilt angle of the cutting machine body 30 is fixed. Further, when the operation knob 91 is turned in the opposite direction to the first direction, the tilt plate 71 and the angular plate 61 are unclamped in the front-rear direction. The operation knob 91, the shaft 92, the through hole 65 and the shaft fixing part 711 serve as an angle fixing part **9*f* that can fix the tilt angle of the cutting machine body 30 relative to the base 20**.

As shown in FIG. 3, the rear tilt support part **6*r* is formed symmetrically to the front tilt support part 6*f* with respect to a virtual plane P orthogonal to the front-rear direction. An angular plate 61 of the rear tilt support part 6*r* is arranged on a rear part of the base 20 on the upper surface 22 side of the base 20. A tilt plate 71 of the rear tilt support part 6*r* is arranged just in front of the angular plate 61 of the rear tilt support part 6*r* on a rear part of the base part 51. An operation knob 91 of an angle fixing part 9*r* is arranged on a rear surface of the angular plate 61 of the rear tilt support part 6*r*. The other structures of the rear tilt support part 6*r* and the angle fixing part 9*r* are respectively identical to those of the front tilt support part 6*f* and the angle fixing part 9*f*** except that they are symmetrical in the front-rear direction, and are therefore not described.

In the circular saw 10 having the above-described structure, the cutting machine body 30 can be tilted in the tilting direction T along a circular arc around the tilt axis C between a position where the blade 35 is orthogonal to the base 20 (see FIGS. 1, 2 and 4) and a position where the blade 35 is tilted at a prescribed maximum tilt angle relative to the base 20. The tilt angle of the cutting machine body 30 is fixed by fastening the operation knob 91. The tilt angle can be confirmed by an angle memory 611 (see FIG. 1) displayed on the angular plate 61 of the front tilt support part **6*f***.

A user can unclamp the front tilt plate 71 and the front angular plate 61 by loosening the operation knob 91 of the angle fixing part **9*f* when the circular saw 10 is placed in a perpendicular position (the tilt angle is 0°) as shown in FIG. 1. Similarly, the user can also unclamp the rear tilt plate 71 and the rear angular plate 61 by loosening the operation knob 91 of the angle fixing part 9*r*. In this state, the cutting machine body 30 can be tilted around the tilt axis C. The user can tilt the blade 35 relative to the base 20 as shown by broken line in FIG. 4 by tilting the cutting machine body 30 to the right from the perpendicular position (see FIGS. 1 and 2) where the blade 35 is orthogonal to the base 20**.

When the cutting machine body 30 is tilted to the right from the perpendicular position shown in FIG. 1, the front surface 72 of the tilt plate 71 is tilted to the right in interlocking with the cutting machine body 30 while sliding in contact with the rear surface 62 of the angular plate 61. At this time, the front part 731 of the guide pin 73 fixed to the tilt plate 71 moves along the circular arc groove 641 of the guide plate 64 while sliding in contact with the guide plate 64. The guide plate 64 defining the circular arc groove 641 restricts movement of the guide pin 73 in the up-down direction and the left-right direction. In other words, the circular arc groove 641 and the guide pin 73 support (guide) the cutting machine body 30 to tilt around the tilt axis C.

When the tilt plate 71 is tilted around the tilt axis C, the link arm 83 tilts around the axis D of the support shaft 81 in interlocking with tilting of the tilt plate 71. Further, the shaft 92 of the angle fixing part **9*f* moves within the through hole 65 together with the tilt plate 71. When the user fastens the operation knob 91 at a desired tilt angle, the tilt plate 71 and the angular plate 61 are clamped together in the front-rear direction and the tilt angle of the cutting machine body 30 to the base 20** is fixed.

In the above-described circular saw 10 of this embodiment, the tilt plate 71 and the angular plate 61 are connected by the link arm 83, and the link arm 83 tilts around the axis D parallel to the tilt axis C of the cutting machine body 30. By the provision of the structure in which the link arm 83 connects the tilt plate 71 and the angular plate 61, the connected state between the tilt plate 71 and the angular plate 61 is maintained regardless of the tilt angle. This reduces rattling between the tilt plate 71 and the angular plate 61 due to increase of the tilt angle, so that the cutting machine body 30 can be smoothly tilted relative to the base 20.

The circular saw 10 is configured such that the cutting machine body 30 is tilted relative to the base 20 around the tilt axis C, and the tilt axis C is a virtual axis arranged below the lower surface 21 of the base 20. With this structure, displacement of the cutting position of the workpiece W depending on the tilt angle is reduced.

The axis D of the link arm 83 is a center axis of the support shaft 81, and the support shaft 81 is fixed to the base 20 (the angular plate 61). Thus, the link arm 83 is stably tilted. Further, in this embodiment, the tangible support shaft 81 supports the mass of the blade 35 while the virtual tilt axis C is arranged below the lower surface 21 of the base 20, so that the cutting machine body 30 can be smoothly tilted.

The tilt support parts **6*f*, 6*r* each have the circular arc groove 641 formed in the angular plate 61 and extending along the tilting direction T of the cutting machine body 30, and the guide pin 73 provided on the tilt plate 71. The rear part 732 of the guide pin 73 is fixed to the tilt plate 71, and the front part 731 of the guide pin 73 protrudes toward the circular arc groove 641. When the tilt plate 71 is tilted in interlocking with the cutting machine body 30, the front part 731 of the guide pin 73 slides along the circular arc groove 641. Regardless of the tilt angle of the cutting machine body 30, the circular arc groove 641 (the guide plate 64 defining the circular arc groove 641) restricts movement of the guide pin 73 in directions (the up-down direction and the left-right direction) other than the direction along the circular arc groove 641. This reduces rattling between the tilt plate 71 and the angular plate 61 due to increase of the tilt angle of the cutting machine body 30, so that the cutting machine body 30 can be further smoothly tilted relative to the base 20**.

The guide plate 64 is separately formed from the angular plate 61. In this embodiment, the guide plate 64 is formed of steel, and the angular plate 61 is formed of aluminum or synthetic resin. With this structure, the wear resistance of parts of the circular saw 10 that slide by tilting operation is secured while the weight of the circular saw 10 is reduced.

The circular arc groove 641 is arranged radially inward of the through hole 65 of the angle fixing part 9*f*, so that space of the tilt support part 6*f* can be effectively utilized.

In this embodiment, the circular saw 10 that is a kind of a portable cutting machine is adopted as a cutting machine of the present disclosure. Generally, in a portable cutting machine, when the cutting machine body 30 is tilted, user's force is easily applied to the cutting machine body 30, compared with a stationary cutting machine such as a table saw. In such a portable cutting machine, the above-described rattling tends to occur during tilting operation. In the circular saw 10 of this embodiment, however, the provision of the above-described front and rear tilt support parts 6*f*, 6*r* reduces rattling during tilting operation, so that a user can smoothly tilt the cutting machine body 30.

Second Embodiment

A circular saw 10A according to a second embodiment of the present disclosure is now described with reference to FIGS. 10 to 14. The circular saw 10A of the second embodiment is different from the first embodiment in the structure of the tilt support part. In the following description, components or elements identical to those of the first embodiment are given the same numerals and are not described.

Figure 12:
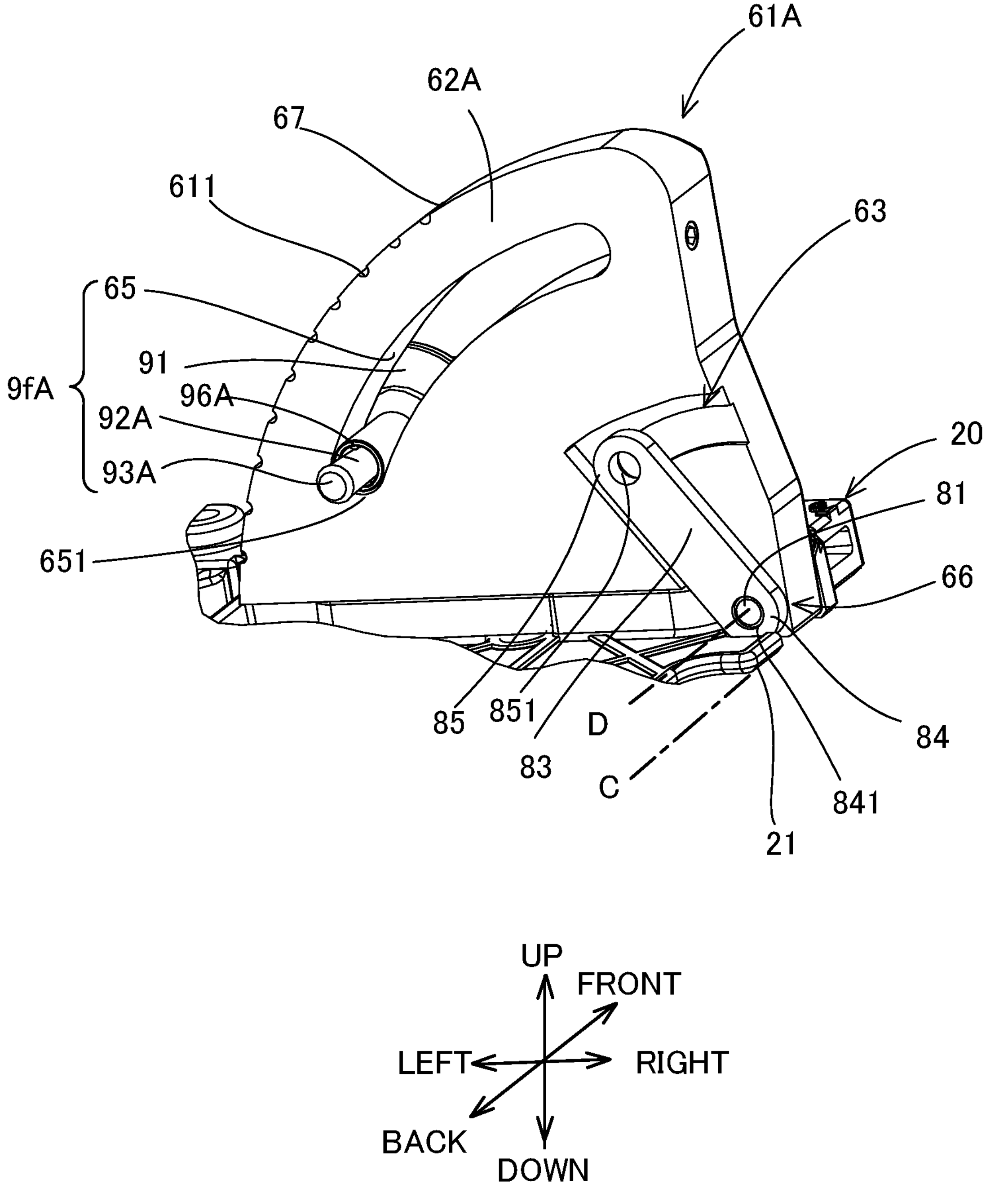
FIG. 12 is a rear view showing the front tilt support part and a link plate of the second embodiment.

A front tilt support part 6*f*A is described as an example of a tilt support part of the circular saw 10A of this embodiment. As shown in FIG. 12, the guide plate 64 of the first embodiment is not provided on a rear surface 62A of the front tilt support part 6*f*A. The guide pin 73 is not fixed to a front surface 72A of a tilt plate 71A. The circular saw 10A of this embodiment is configured such that an angle fixing shaft 92A and a through hole 65 of an angle fixing part 9*f*A respectively serve as the guide pin 73 and the circular arc groove 641 of the first embodiment.

Figure 13:
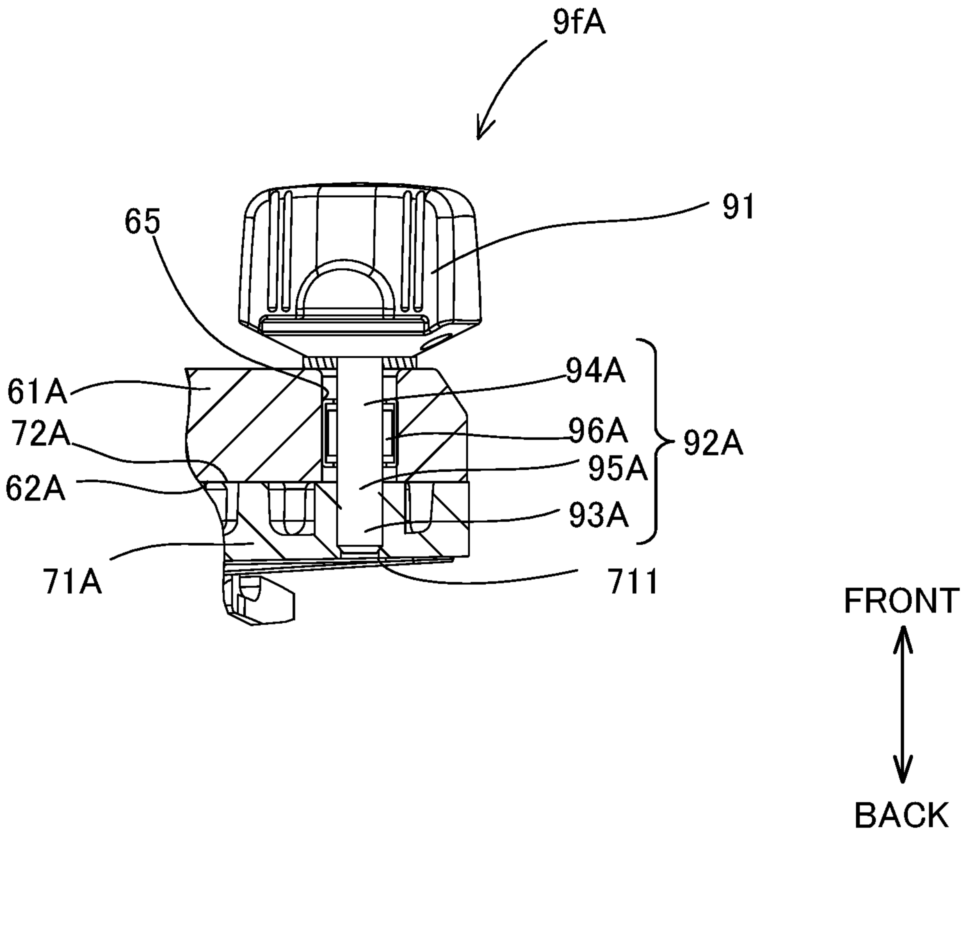
FIG. 13 is a sectional view taken along line XIII-XIII in FIG. 11.
Figure 14:
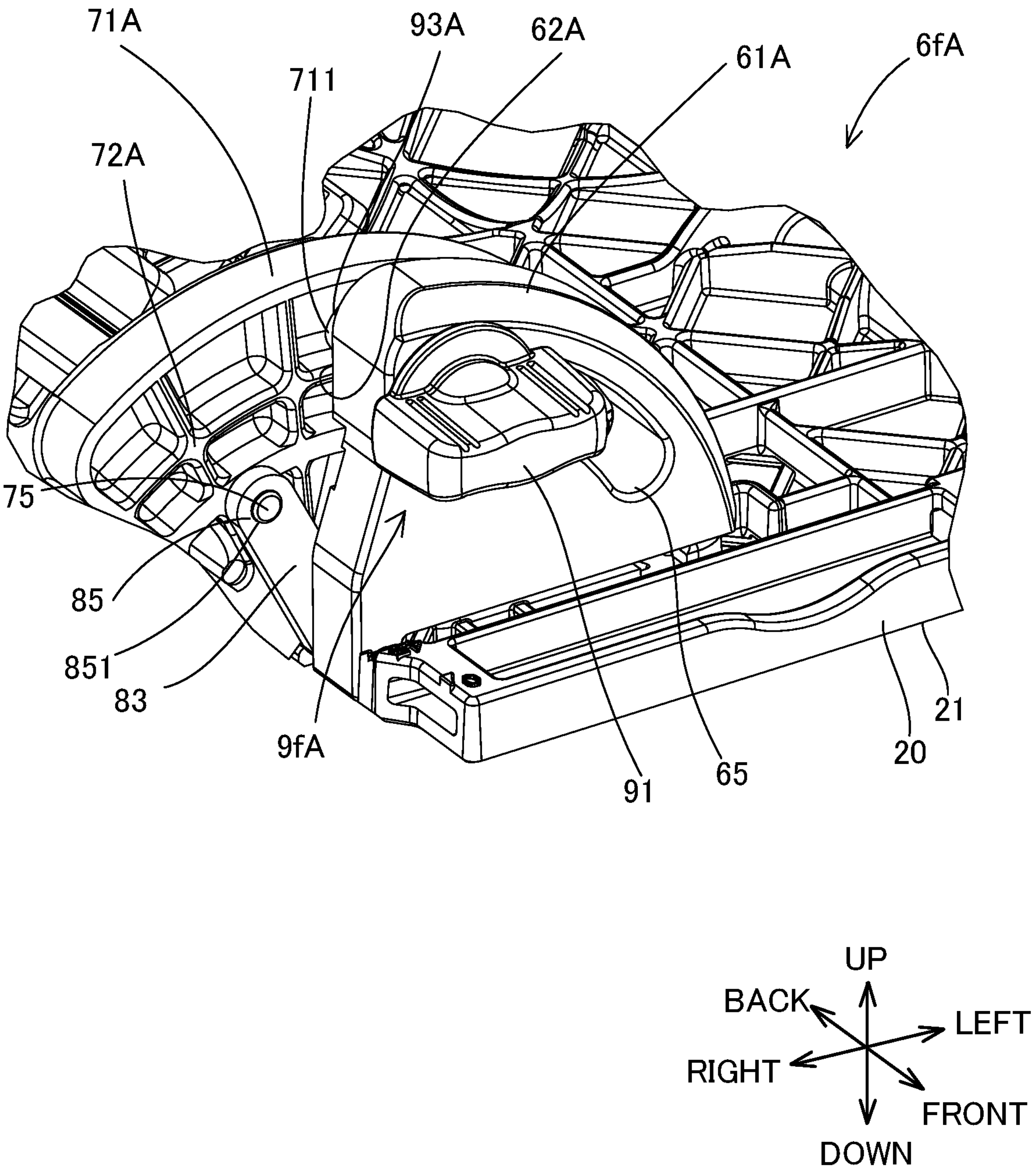
FIG. 14 is an enlarged view showing the front tilt support part and its vicinity of the second embodiment, with the cutting machine body set at the tilt angle of 45°.

As shown in FIG. 13, the angle fixing shaft 92A includes a shaft body 95A extending in the front-rear direction and a bearing 96A fitted onto the shaft body 95A. A rear end part 93A (first part) of the shaft 92A is fixed to the shaft fixing part 711 of the tilt plate 71A. A front part 94A (second part) of the shaft 92A is arranged within the through hole 65. The bearing 96A is fitted onto the front part 94A. A sliding bearing or a rolling bearing can be applied as the bearing 96A. A part of the shaft 92A on which the bearing 96A is fitted has such an outer diameter as to be allowed to slide in the through hole 65 as a whole. The circular saw 10A has a rear tilt support part and an angle fixing part that are respectively formed symmetrically to the front tilt support part 6*f*A and the angle fixing part 9*f*A with respect to a virtual plane P orthogonal to the front-rear direction. The rear tilt support part and the angle fixing part of the circular saw 10A respectively have the same structures as the front tilt support part 6*f*A and the angle fixing part 9*f*A except that they are symmetrical to the front tilt support part of 6*f*A and the angle fixing part 9*f*A in the front-rear direction, and are therefore not described and shown.

In this embodiment, like in the first embodiment, a user can unclamp the front tilt plate 71A and the front angular plate 61A by loosening the operation knob 91 of the angle fixing part 9*f*A when the circular saw 10A is placed in a perpendicular position (the tilt angle is 0°). Further, the user can also unclamp the rear tilt plate 71A and the rear angular plate 61A by loosening the operation knob 91 of the rear angle fixing part (not shown). When the cutting machine body 30 is tilted to the right from the perpendicular position by user's operation, the front surface 72A of the tilt plate 71A is tilted to the right in interlocking with the cutting machine body 30 while sliding in contact with the rear surface 62A of the angular plate 61A (see FIG. 14). At this time, the shaft 92A moves along the through hole 65 with the front part 94A sliding in contact with the through hole 65. The through hole 65 restricts movement of the shaft 92A in the up-down direction and the left-right direction. When the tilt plate 71A is tilted around the tilt axis C, the link arm 83 tilts around the axis D of the support shaft 81 in interlocking with tilting of the tilt plate 71A. When the user fastens the operation knob 91 at a desired tilt angle, the tilt plate 71A and the angular plate 61A are clamped together in the front-rear direction and the tilt angle of the cutting machine body 30 relative to the base 20 is fixed.

In the above-described circular saw 10A of the second embodiment, the circular arc tilt angle fixing through hole 65 and the angle fixing shaft 92A are utilized to reduce rattling between the tilt plate 71A and the angular plate 61A due to increase of the tilt angle of the cutting machine body 30 while supporting (guiding) the cutting machine body 30 to tilt around the tilt axis C. Therefore, the cutting machine body 30 can be smoothly tilted relative to the base 20, while the structure of the tilt support part 6*f*A is simplified.

The shaft 92A can be smoothly slid relative to the through hole 65 due to provision of the bearing 96A. Thus, wear of the through hole 65 is reduced.

Correspondences

Correspondences between the features of the above-described embodiments and the features of the present disclosure are as follows. However, the features of the above-described embodiments are merely exemplary and do not limit the features of the present disclosure.

The circular saw 10, 10A is an example of the "cutting machine" and the "portable cutting machine". The workpiece W is an example of the "workpiece". The abutment surface 21 or the lower surface 21 is an example of the "abutment surface". The base 20 is an example of the "base". The motor 33 is an example of the "motor". The tilt axis C is an example of the "first axis". The cutting machine body 30 is an example of the "cutting machine body". The front tilt support part 6*f*, 6*f*A and the rear tilt support part 6*r* are an example of the "at least one tilt support part". The tilt plate 71, 71A is an example of the "tilt plate". The angular plate 61, 61A is an example of the "angular plate". The front surface 72 and the rear surface 62 are examples of the "facing surface". The link arm 83 is an example of the "link arm". The axis D is an example of the "second axis". The front-rear direction is an example of the "direction parallel to the first axis". The upper side and the lower side are examples of the "second side" and the "first side", respectively. The circular arc groove 641 and the through hole 65 are examples of the "circular arc groove". The guide pin 73 and the shaft 92A are examples of the "guide pin". The rear part 732 of the guide pin 73 and the front part 94A of the shaft 92A are examples of the "first part". The front part 731 of the guide pin 73 and the rear part 93A of the shaft 92A are examples of the "second part". The base end part 84 and the distal end part 85 of the link arm 83 are examples of the "base end part" and the "distal end part", respectively. The tilting direction T is an example of the "tilting direction". The angle fixing part 9*r*, 9*f* is an example of the "angle fixing part". The through hole 65 is an example of the "fixing groove". The shaft 92, 92A is an example of the "angle fixing shaft". The operation knob 91 is an example of the "operation part". The guide plate 64 is an example of the "guide plate". The first and second ends 646, 647 of the circular arc groove 641 are examples of the "first end" and the "second end", respectively. The first and second pins 642, 643 are examples of the "first pin" and the "second pin", respectively. The shaft body 95A is an example of the "shaft body". The bearing 96A is an example of the "bearing". The support shaft 81 is an example of the "support shaft". The link arm locking pin 75 is an example of the "distal end shaft". The grip 36 is an example of the "grip part".

Other Embodiments

In the first embodiment, the circular arc groove 641 need not be formed in the guide plate 64, and, for example, it may be integrally formed with the angular plate 61. When the angular plate 61 is formed of aluminum or synthetic resin, a bearing may be provided around the shaft of the guide pin 73. In this embodiment, wear of the circular arc groove 641 formed in the angular plate 61 due to sliding of the guide pin 73 is reduced while the guide pin 73 is smoothly slid relative to the circular arc groove 641.

The materials of the angular plate 61, 61A, the tilt plate 71, 71A, the guide plate 64 and other members in the above-described embodiments may be arbitrarily changed.

In the first embodiment and the above-described other embodiments, the circular arc groove 641 may be formed in the tilt plate 71, and the guide pin 73 may be provided on the angular plate 61. This embodiment also has the same effect as the first embodiment.

The circular saw 10, 10A may be provided with a power cord that is connectable to an external AC power source and driven by the external AC power source.

The above-described structures can be applied not only to the circular saw 10, 10A but to other cutting machines, including a non-plunge circular saw, a table saw and a flip-over saw.

In the above-described embodiments, the cutting machine may have only one tilt support part 6*f* (6*f*A), 6*r*. For example, the cutting machine may have only the tilt support part 6*f* (6*f*A).

The present disclosure is not limited to the above-described embodiments, but may be implemented by a diversity of configurations without departing from the scope of the disclosure. For example, the technical features of any of the above embodiments that correspond to the technical features described above in the Summary may be replaced or combined appropriately, in order to solve part or all of the problems described above or in order to achieve part or all of the advantageous effects described above. Any of the technical features may be omitted appropriately unless the technical feature is described as essential in the description hereof.

DESCRIPTION OF THE REFERENCE NUMERALS

6*f*, 6*r*, 6*f*A: tilt support part, 6*f*, 6*f*A: front tilt support part, 6*r*: rear tilt support part, 9*f*, 9*f*A: angle fixing part, 10, 10A: circular saw, 20: base, 21: lower surface, abutment surface, 22: upper surface, 23: saw guide, 30: cutting machine body, 31: body part, 32: motor housing, 33: motor, 34: gear housing, 35: blade, 36: grip, 37: battery mounting part, 39: biasing spring, 40: cover, 41: left side wall, 42: right side wall, 43: through hole, 45: mounting part, 50: body support part, 51: base part, 52: holding part, 53: vertical oscillation shaft, 61, 61A: angular plate, 62, 62A: rear surface, 63: recess, 64: guide plate, 65: through hole, 66: corner part, 67: outer edge, 71, 71A: tilt plate, 72, 72A: front surface, 73: guide pin, 75: link arm locking pin, 81: support shaft, 83: link arm, 84: base end part, 85: distal end part, 91: operation knob, 92, 92A: shaft, 93, 93A: rear end part, 94A: front end part, 95A: shaft body, 96A: bearing, 200: battery, 611: angle memory, 612: hole, 613: hole, 641: circular arc groove, 642: first pin, 643: second pin, 646: first end, 647: second end, 651: end part, 711: shaft fixing part, 731: front part, 732: rear part, 841: hole, 851: hole, AX1: rotational axis, AX2: axis, AX3: axis, C: tilt axis, D: axis, P: virtual plane, T: tilting direction, W: workpiece

The invention claimed is:

1. A cutting machine, comprising:
a base having an abutment surface for abutment with a workpiece;
a cutting machine body that includes an electric motor configured to provide a rotational driving force to a blade and is arranged on a second side relative to the abutment surface of the base; and
at least one tilt support part that supports the cutting machine body such that the cutting machine body can be tilted relative to the base around a first axis,
wherein the at least one tilt support part includes:
a tilt plate that protrudes to the second side relative to the base and is fixed to the cutting machine body,
an angular plate that protrudes to the second side relative to the base and is arranged to face the tilt plate in a direction parallel to the first axis and fixed to the base, and
a link arm configured to connect the tilt plate and the angular plate, and
wherein the cutting machine is configured such that when the cutting machine body is tilted:
the tilt plate tilts together with the cutting machine body, and facing surfaces of the tilt plate and the angular plate slide in contact with each other, and
the link arm tilts around a second axis parallel to the first axis in interlocking with tilting of the cutting machine body, and
wherein the link arm is arranged between the tilt plate and the angular plate.

2. The cutting machine as defined in claim 1, wherein the second axis is provided on the second side relative to the abutment surface of the base.

3. The cutting machine as defined in claim 1, wherein the first axis is arranged on a first side opposite to the second side relative to the abutment surface of the base.

4. The cutting machine as defined in claim 1, wherein:
the at least one tilt support part includes:
a circular arc groove that is formed in the angular plate and extends in a circular arc shape along a tilting direction of the cutting machine body, and
a guide pin that has a first part fixed to the tilt plate and a second part protruding toward the circular arc groove and is configured to slide along the circular arc groove when the tilt plate is tilted.

5. The cutting machine as defined in claim 4, wherein:

the link arm has a base end part arranged on the second axis and a distal end part on an opposite side to the base end part, and the distal end part is fixed to the tilt plate on a side closer to the first axis than the circular arc groove and configured to tilt together with the tilt plate.

6. The cutting machine as defined in claim 4, further comprising:

an angle fixing part configured to fix a tilt angle of the cutting machine body relative to the base, the angle fixing part including:

a fixing groove that is formed in the angular plate and extends in a circular arc shape along the tilting direction of the cutting machine body, an angle fixing shaft that extends in parallel to the first axis and is inserted through the fixing groove and locked to the tilt plate, and an operation part that is connected to the angle fixing shaft and configured to be operated by a user to fix the tilt plate and the angular plate in a direction parallel to the first axis, wherein the circular arc groove is arranged on a side closer to the first axis than the fixing groove.

7. The cutting machine as defined in claim 6, wherein:

the circular arc groove comprises the fixing groove formed in the angular plate, and the guide pin comprises the angle fixing shaft.

8. The cutting machine as defined in claim 4, wherein the at least one tilt support part further includes a guide plate that is separately formed from the tilt plate and the angular plate and fixed to the angular plate, the guide plate having the circular arc groove.

9. The cutting machine as defined in claim 8, wherein the guide plate is formed of steel.

10. The cutting machine as defined in claim 8, wherein:

the at least one tilt support part further includes a first pin arranged in a first end of the circular arc groove and a second pin arranged in a second end opposite to the first end of the circular arc groove, and the first and second pins fix the guide plate to the angular plate.

11. The cutting machine as defined in claim 4, wherein the guide pin has a shaft body and a bearing fitted onto the shaft body.

12. The cutting machine as defined in claim 5, wherein:

the at least one tilt support part includes a support shaft fixed to the angular plate and having the second axis as a center axis, and a distal end shaft fixed to the tilt plate, the base end part of the link arm is fitted on the support shaft and tilts around the support shaft, and the distal end part of the link arm is fitted on the distal end shaft.

13. The cutting machine as defined in claim 1, wherein the cutting machine comprises a portable cutting machine having a grip part configured to be held by a user.

14. The cutting machine as defined in claim 1, wherein the first axis is parallel to the abutment surface.

15. The cutting machine according to claim 1, wherein the link arm is accommodated in a recess, and arranged so as not to interfere with sliding contact between the tilt plate and the angular plate.

16. The cutting machine according to claim 4, wherein a tilting locus of the cutting machine body is guided by the circular arc groove and the guide pin.

17. The cutting machine according to claim 12, wherein the second axis corresponds to the center axis of the support shaft.

18. The cutting machine according to claim 1, wherein the link arm is configured to (i) tilt in a same direction as the cutting machine body in association with tilting of the cutting machine body, and (ii) tilt relative to the cutting machine body.

* * * * *